UNITED STATES PATENT OFFICE.

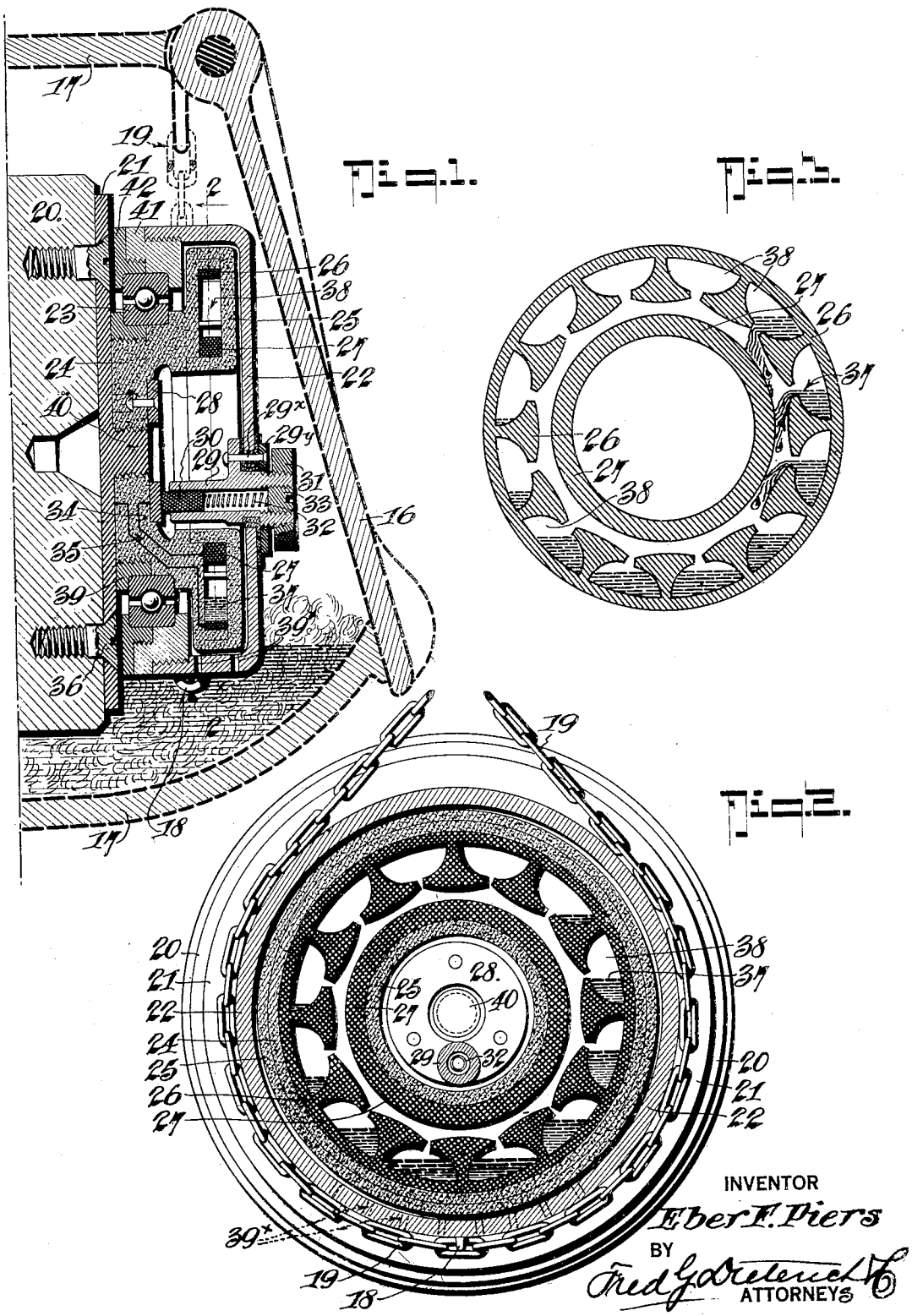

EBER FRANCIS PIERS, OF OGDEN, UTAH.

CIRCUIT-CLOSER.

1,323,094.　　　　　Specification of Letters Patent.　　Patented Nov. 25, 1919.

Application filed March 21, 1919. Serial No. 284,015.

*To all whom it may concern:*

Be it known that I, EBER F. PIERS, a citizen of the United States, residing at Ogden, in the county of Weber and State of Utah, have invented a new and Improved Circuit-Closer, of which the following is a specification.

My invention relates to a certain new and useful electric circuit closer or governor especially adapted for use in connection with railway brake systems and in its generic nature the invention comprises a governor mechanism capable of being attached to the end of the car axle within the journal box and rotating at the axle speed. The present invention, which has been especially designed for use in connection with the improvements in air brake system disclosed in my copending application Serial No. 284,014, filed on even date herewith, primarily has for its object to provide a governor mechanism for opening and closing an electric circuit in a quick, positive and effective manner, the invention also including provisions for protecting the governor against damage, insuring its proper operation in cold weather, maintaining proper lubrication of the moving parts, and having provision whereby it may be easily inspected, attached or detached and will not require adjustment.

Another object of the invention is to provide an electric circuit governor of the mercury contact type, *i. e.*, the type in which the circuit is closed between terminals by fluid mercury and in this respect the invention has particularly for its object to provide for the hermetic sealing of the mercury in a chamber whereby it will be protected against contamination or leakage and whereby volatilization of the mercury, if it occurs, will not interfere with the successful operation of the device, since the inclosing of the mercury in the hermetically sealed chamber insures the functional return of the volatilized mercury on condensation.

In its more detailed nature the invention consists of a pair of contact members mounted on and rotatable with the car axle, the contact members being themselves mounted within a closed chamber containing the circuit closing mercury, one of the contact members having pockets or "buckets" for the mercury from which the mercury is spilled onto the other contact elements and thereby bridges the gap between the contact elements to close the circuit during rotation of the contact elements with the axle. Provision is also made for the connections of the circuit terminals electrically with the respective contact members.

In its more detailed nature, the invention furthermore resides in those novel details of construction, combination and arrangement of parts, all of which will be first fully described, then pointed out in the appended claims and illustrated in the accompanying drawing, in which:—

Figure 1 is a vertical longitudinal section of a portion of a car wheel axle and journal box with the invention applied.

Fig. 2 is a cross section on the line 2—2 of Fig. 1.

Fig. 3 is a diagrammatic section similar to Fig. 2 illustrating the action of the device when the axle is turning.

In the drawing, in which like numerals of reference indicate like parts in all of the figures, 20 represents the end of the car wheel axle, to the end of which is attached a disk 21 having a threaded stud 40 on which is screwed an insulating body 24 which carries the inner element of a ball bearing 23, the latter being held in place by a ring 39 screwed onto the insulating body 24. 41 is a retaining ring which is recessed to receive the outer element of the ball bearing 23, the latter being held in place by another retaining ring 42 which is screwed to ring 41, as clearly shown in Fig. 1. 22 designates a cover or cap which is threaded onto the retaining ring 41. The retaining rings 41—42 and the cover 22 are held against rotation by a chain 19 which may be pinned at 18 and which has its ends anchored in any suitable manner to the axle bearing box 17, the axle bearing box 17 and its cover 16 being of the ordinary construction.

The disk 21 is centrally attached to the car axle by suitable screws 36.

26—27 designate the contact members which are preferably made of carbon. The member 26 is placed in position in the insulating body 24 and the member 27 is placed on the hub-like portion of the cap 25, the cap 25 being also made of insulating material and pressed into place on the insulating body 24. The parts 24 and 25 may be secured together in any suitable way by cementing or otherwise as may be found convenient. When the parts 24 and 25 are assembled with the contained contacts 26—27, it should be understood that a suitable quantity of mercury 37 is placed in the chamber between the parts 24—25 so as to enter the pockets 38 of the contact member 26.

28 designates a collecting ring which is suitably mounted concentrically on the insulating body 24 and is electrically connected by a lead 34 with the contact member 27, while the contact 26 is electrically connected by a lead 35 with the disk 21 and is by it, in turn, grounded to the axle 20.

The ungrounded circuit wire is brought into connection with the ring 28 in a manner now to be explained. 29 designates a brush holder in which the carbon brush 30 is held, the brush 30 being mounted in contact with the ring 28 by a spring 32 and the brush 30 may be inserted in position through the hollow brush holder 29 from the outer end and the spring 32 held in place by a plug 33 which is removably screwed into the holder 29 and serves to close the outer end of the same. The holder 29, as will be noticed, is insulated from but mounted on the metallic cover 22 by suitable rivets $29^x$ which also hold a ring $29^y$ between which, and the knurled nut 31, the circuit wire may be clamped, as will be clear to those skilled in the art.

Suitable drain holes $39^x$ are provided for the lubricant which works through the bearings 23.

It will be observed that by my construction when the rotating parts are in action, the mercury 37 is carried up in the pockets 38, overflowing or spilling out through the openings adjacent to the contact ring 27, running back to the bottom, and in doing so the mercury entirely fills the space between the adjacent faces of the members 26—27, thus bridging the gap and closing the electric circuit there. At the instant of cessation in rotation, the electrical connection is broken. The lubricant within the journal box is sufficient to lubricate the bearings 23 and by locating the device within the journal box it is protected by the journal box from injury and in cold weather the frictional heat of the journal is sufficient to keep the governor warm enough for the mercury 37 to run freely.

It will also be noticed that the mercury is mounted in a hermetically sealed chamber formed between the insulating parts 24—25 so that should any of the mercury vaporize it cannot escape and be lost but will condense and return to function. Furthermore, the hermetic inclosure of the mercury within the chamber prevents the oil or lubricant or other foreign substances from working into the chamber and thus contaminate the mercury; hence the mercury is always kept in a clean and freely active state regardless of weather conditions or the external surroundings of the device.

In order to inspect the device, it is only necessary to open the journal box cover 16.

By attaching the device to the end of the axle within the journal box it is out of the way and not liable to become injured. It is so simple that it does not interfere with the taking care and lubrication of the car journals and needs no adjustment or attention. In the event of the journal burning up as the result of a hot box, it can be easily replaced. The slow speed at which it operates (not over 700 R. P. M.) insures the life of the bearings indefinitely and also precludes the necessity of having to change or adjust the brush 30.

While I have designed this device especially with the object in view of rendering it particularly useful in connection with the compound relief valve mechanism disclosed in my copending application hereinbefore mentioned, nevertheless the device is of general application and may be used wherever a speed controlled circuit closer is required and I do not wish to limit myself to any specific use of the device.

From the foregoing description taken in connection with the accompanying drawing, it is thought the complete construction, operation and advantages of the invention will be readily understood by those skilled in the art.

What I claim is:

1. A device of the class described, the combination with the axle bearing box and the car axle; of a circuit closing device mounted on the car axle within the axle bearing box and including stationary and rotatable elements, the moving bearing surfaces of which receive their lubrication from the axle lubricant within the bearing box.

2. A circuit closer comprising a rotating body, a pair of contact rings mounted on said body and insulated from one another, one of said contact rings including pockets having spillways and mercury contained in said pockets and adapted to spill from the same onto the other contact member to close the gap between said contact members upon rotation of the same.

3. A device of the class described, the combination with the axle bearing box and the car axle; of a circuit closing device mounted on the car axle within the axle bearing box and including stationary and rotatable contactor elements, the moving bearing surfaces of which receive their lubrication from the axle lubricant within the bearing box, and means for effecting the electrical connection between said contactor elements respectively and an external circuit.

4. A circuit closer comprising a rotating body, a pair of contact rings mounted on said body and insulated from one another, one of said contact rings including pockets having spillways and mercury contained in said pockets and adapted to spill from the same onto the other contact member to close the gap between said contact members upon rotation of the same, and means for effecting electrical connection between said contact members respectively and an external circuit.

5. A circuit closer comprising a plate, means for securing said plate to the end of a car axle or other rotative body, an insulating body carried by and rotatable with said plate, a pair of contact members carried in a chamber in said insulating body held out of electrical contact one with the other, a current conducting fluid hermetically sealed within said chamber and adapted to close said circuit between said contact members upon rotation of said insulating body, means for electrically connecting one of said contact members with said plate, a current distributing ring carried by said insulating body and electrically connected with the other of said contact members, and a stationarily held brush device engaging said ring to which an external circuit may be connected.

6. A circuit closer comprising a plate adapted to be secured to the end of a rotating shaft, an insulating body secured to said plate and projecting from the same, a cover member over said insulating body, a bearing member between said insulated body and said cover member, means for holding said cover member against rotation while said insulating body rotates with the plate, said insulating body having a hermetically closed chamber, two contact rings and a fluid current conducting medium located within said chamber and arranged whereby said contact rings will be out of electrical connection when the parts are stationary, and means causing said fluid current conducting medium to bridge the gap between said rings upon rotation of said insulating body to thereby electrically connect said contact rings together, and means whereby external circuit terminals may be brought into electrical connection with the rings respectively.

EBER FRANCIS PIERS.